United States Patent
Aunspaugh

[11] 3,943,652
[45] Mar. 16, 1976

[54] FISHING LEADER
[76] Inventor: Aaron F. Aunspaugh, 5638 Northridge, Houston, Tex. 77033
[22] Filed: Feb. 4, 1974
[21] Appl. No.: 439,003

[52] U.S. Cl. .............................................. 43/42.74
[51] Int. Cl.² ...................................... A01K 91/00
[58] Field of Search ............ 43/42.74, 43.15, 44.98, 43/44.84

[56] References Cited
UNITED STATES PATENTS
| | | | |
|---|---|---|---|
| 2,392,147 | 1/1946 | Hickson | 43/42.74 |
| 3,426,468 | 2/1969 | Hinkson | 43/42.74 |

*Primary Examiner*—Warner H. Camp

[57] ABSTRACT

A fishing leader for rigging multiple hooks on a single line which incorporates a main leader adapted to be connected at the upper end to a fishing line and to a suitable weight at the lower end, the apparatus incorporating one or more points of connection for hooks. The hooks are carried to the side of the main line to avoid tangling the hooks with the main line. In the event multiple connections are incorporated, they extend laterally to the side at spaced locations and can be positioned at different angles to position the hooks where entanglement will be avoided. Each hook is supported from preferably a swivel which connects to the point of termination of multiple strands which are constructed and arranged to bend away from the main cable.

5 Claims, 3 Drawing Figures

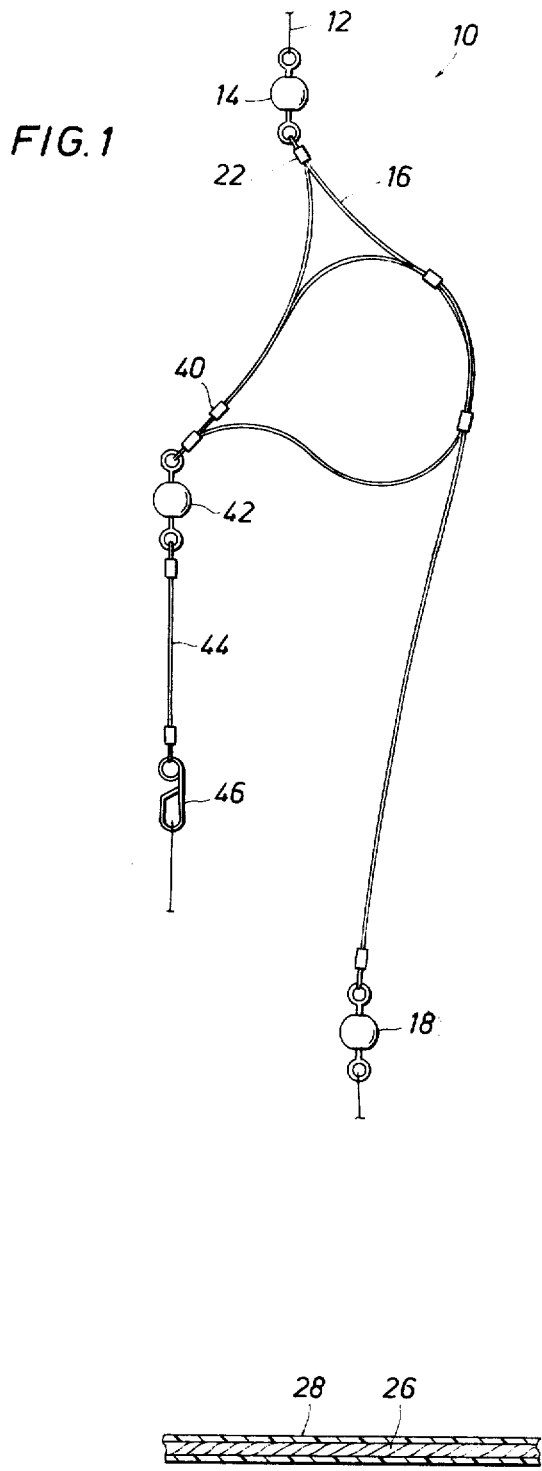
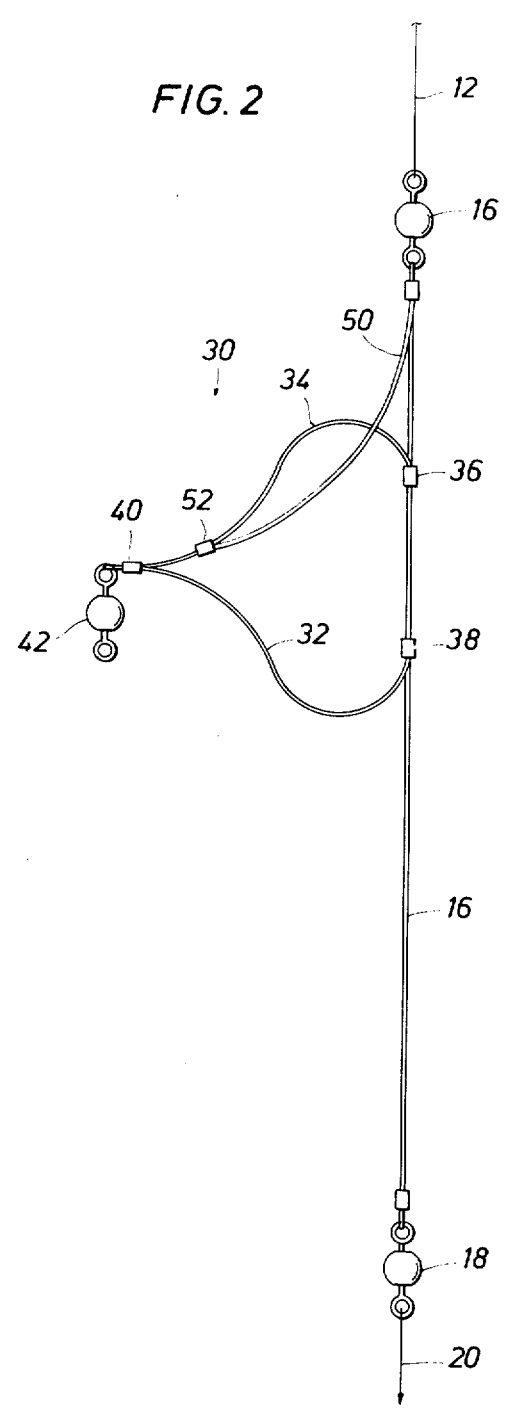

FISHING LEADER

BACKGROUND OF THE INVENTION

In fishing in ocean waters for fish which school, such as red snapper, it is customary to rig a fishing line with multiple hooks. They are all connected to a common leader and share a common weight, and all hang downwardly by gravity and approximately coincide with the main line. Often treble hooks are used. It is likely that multiple treble hooks hung from multiple points on a leader will become entangled. Often a monofilament line is used to avoid observation by fish. A monofilament line must often be connected through a swivel to a leader and becomes entangled with the hooks, thereby defeating the purpose of the line. The tangling can become so severe that it is difficult for the fisherman to disengage the hooks from the leader.

The swivel in this invention is held to the side by the use of multiple strands of fairly stiff fishing line. They are connected to the main line in a manner causing them to extend away from it rather than to hang parallel. They are preferably fabricated of fishing line which is somewhat stiffer such as plastic coated flexible metal line. It is stiffer and more readily able to bend to a specified position and maintain it.

SUMMARY OF THE INVENTION

The present invention is summarized as a fishing leader assembly for use with multiple hooks. It is adapted to be connected to a fishing line by means of a swivel, and incorporates a main leader line connected to the fishing line at the top end and supporting a weight at the bottom. One or more points of connection for a hook are maintained. The connective points are held to the side by stiff fishing lines which connect together to support a swivel. The swivel is held to the side, thereby enabling multiple swivels to support multiple hooks at spaced locations along the main leader line and at different angles relative to the main line.

DESCRIPTION OF THE DRAWINGS

FIG. 1 is a view of the fishing leader of the present invention in a relaxed or un-weighted posture showing only one point of connection for a hook;

FIG. 2 is a view of the apparatus shown in FIG. 1 with the main leader line pulled nearly straight by placing a weight on the bottom thereof; and, FIG. 3 is a sectional view through the line used to fabricate a portion of the apparatus.

DESCRIPTION OF THE PREFERRED EMBODIMENT

Attention is first directed to FIG. 1 where the fishing leader 10 is shown. A suitable fishing line 12 supplied from a rod and reel connects to a swivel 14. The swivel 14 supports the main leader line 16. The main leader line 16 extends from the upper swivel 14 to a lower swivel 18. The lower swivel 18 is adapted to be connected to a weight 20 as shown in FIG. 2. The main line 16 is formed into a loop or eyelet at its upper end by means of a crimped sleeve 22. The crimped sleeve 22 is used at various points in the apparatus to join and fix two members of flexible line together. At the lower eyelet, the main line is looped back on itself to form a loop or eyelet for connection with the lower swivel 18. Two or more portions of fishing line used in construction of the apparatus 10 are secured together by the crimped sleeves 22 at various points in the apparatus.

FIG. 3 is a sectional view through a portion of the main line 16, and other portions of the apparatus. The main line 16 and the other portions of the apparatus 10 are fabricated out of relatively stiff fishing line. It is customary to build a leader from line which is fairly strong in comparison with the equipment to be used with it. This is particularly true for salt water fishing. The leader must be strong and abrasion resistant. FIG. 3 shows in section a substantially strong line 26 which is encased in a sheet of resilient line 28. The line 26 can be a woven or multi-strand steel cable. The covering 28 protects the line 26 against rust. The covering 28 is typically nylon or other plastic materials. It may have a test upwards of one hundred pounds or more, depending on the size and weight of fish to be sought by the fisherman. The leader apparatus 10 is sized to the fishing line itself, and the weight of tackle chosen by the fisherman.

As shown in FIG. 2, the main line 16 is represented as straight when it is rigged on a line 12 and supports a weight 20. A single means 30 receives and supports a hook. The purpose of the means 30 is to support a hook to the side of the main line 16 so that the hook does not become entangled. The means 30 can be duplicated at multiple points along the main line 16. They can be oriented at different angles with respect to the main line 16 as a common axis. Through this arrangement, multiple hooks can be supported by the main line and entangling of the hooks with the leader apparatus 10 is far less likely through the use of the present invention.

The means 30 incorporates a lower lateral line 32 and a upper lateral line 34. The lines 32 and 34 are joined to the main line 16 by suitable crimped sleeves 36 and 38. The sleeves 36 and 38 secure the lines so that they emerge from the sleeves parallel to the main line. However, they are bent to the side and come together at a common sleeve 40 and support a snap swivel 42. The snap swivel 42 is adapted to support a clear monofilament line 44 as shown in FIG. 1. The clear monofilament leader 44 is then connected to a snap 46 and a hook can be placed on the bottom of the snap swivel 46. When the line 16 is maintained tight or nearly so, the lines 32 and 34 pull against one another and kick to the side. The opposite pull exerted by the looping of the lateral lines 32 and 34 is counterbalanced. They come together at the crimped sleeve 40 and are located to the side of the main line 16. The lines 32 and 34 are preferably located at the same relative angle considering the main line 16 as its axis. Exact precision is not required.

The weight which can be easily experienced by the means 30 is supported by the use of an additional brace line 50 which is not reversed looped but extends from a sleeve above the lateral lines 32 and 34. It is joined to the lateral line 34 by a sleeve 52 and then comes also to the sleeve 40. The connection of the brace line 50 at the sleeve 52 which is not quite so remote laterally shapes the brace line 50 so that the means 30 is reinforced and has an enhanced tendency to stand to the side as opposed to drooping and hanging almost vertically and parallel to the main line 16. The lines 32, 34 and 50 all cooperate and are shaped to extend to the side. Relatively stiff metal fishing line is used in the manufacture of the means 30.

As stated, the means 30 can be duplicated at multiple points along the main line 16. This enables a different untangled hook to be hung from each means 30 so that the leader apparatus 10 can be rigged with several hooks.

The foregoing is directed to the preferred embodiment of the present invention, the scope of which is determined by the appended claims.

I claim:

1. A leader apparatus for installation on a fishing line and adapted to support a fish hook, comprising:
    a main leader line adapted to be connected to a fishing line at its upper end and a weight at its lower end;
    at least one laterally extending means supported at some point along said main line and adapted to receive and support a fish hook at the side of and remote from said main line, and wherein said laterally extending means includes first and second lateral lines connected to and supported by said main line and which come together at a point laterally of said main line such that said lateral lines hold themselves to the side of said main line and thereby support a fish hook on a short line connected to and located laterally of said main line and free of entanglements with said main line; and
    an elongate brace line connected by a connector means to said lateral lines which is curved from a point of connection to said main line to said lateral lines constructed and arranged such that said brace line holds said lateral lines at the side of said main line and supports a load on a hook.

2. The apparatus of claim 1 including a first swivel connected at the lower end of said main line to support a weight thereon.

3. The apparatus of claim 1 including a swivel connected to said lateral lines for supporting a hook.

4. The apparatus of claim 1 including a swivel means at the top end of said main line.

5. The apparatus of claim 1 including a crimped sleeve about the ends of both lateral lines to secure them together and remote from said main line.

* * * * *